United States Patent
Bolkhovitin et al.

(10) Patent No.: US 10,878,111 B2
(45) Date of Patent: Dec. 29, 2020

(54) PEER STORAGE DEVICES SUPPORTING PROTECTION INFORMATION

(71) Applicant: Western Digital Technologies, Inc., San Jose, CA (US)

(72) Inventors: Vladislav Bolkhovitin, San Jose, CA (US); Stephen Gold, San Jose, CA (US); Adam Roberts, Moncure, NC (US); Sanjay Subbarao, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 228 days.

(21) Appl. No.: 16/055,016

(22) Filed: Aug. 3, 2018

(65) Prior Publication Data

US 2020/0042725 A1 Feb. 6, 2020

(51) Int. Cl.
*G06F 21/60* (2013.01)
*G06F 21/64* (2013.01)
(Continued)

(52) U.S. Cl.
CPC ............ *G06F 21/606* (2013.01); *G06F 3/064* (2013.01); *G06F 3/0607* (2013.01);
(Continued)

(58) Field of Classification Search
CPC .. G06F 21/606; G06F 3/0659; G06F 12/0292; G06F 3/0689; G06F 3/0614;
(Continued)

(56) References Cited

U.S. PATENT DOCUMENTS

| | | |
|---|---|---|
| 6,061,794 A | 5/2000 | Angelo et al. |
| 7,340,672 B2 | 3/2008 | Goldschmidt et al. |

(Continued)

OTHER PUBLICATIONS

Holt, K., "End-to-End Data Protection Justification," Jul. 1, 2003, 7 pages.

(Continued)

*Primary Examiner* — Meng Li
(74) *Attorney, Agent, or Firm* — Patent Law Works LLP

(57) ABSTRACT

Example storage systems, storage devices, and methods provide secure transfer of data between peer storage devices using protection information. Data operation commands may be received that use a protection information data block format for transferring a target data block between peer storage devices. A local data operation may operate on the target data block in a first storage device and compare at least one protection information tag value to a first data check value. At least one destination verification protection information tag value and the target data block may be transferred to a second storage device through a peer communication channel. The destination verification protection information tag value may be compared to a destination data block protection information tag value by the second storage device. The second storage device may then execute a data operation on the target data block. Protection information tag values may include guard tag values, reference tag values, and application tag values managed by the peer storage devices.

21 Claims, 6 Drawing Sheets

(51) Int. Cl.
*H04L 29/08* (2006.01)
*G06F 3/06* (2006.01)
*G06F 12/02* (2006.01)

(52) U.S. Cl.
CPC .......... *G06F 3/0614* (2013.01); *G06F 3/0659* (2013.01); *G06F 3/0689* (2013.01); *G06F 12/0292* (2013.01); *G06F 21/64* (2013.01); *H04L 67/108* (2013.01); *G06F 2221/0788* (2013.01)

(58) Field of Classification Search
CPC ........ G06F 3/0607; G06F 3/064; G06F 21/64; G06F 2221/0788; H04L 67/108; H04L 67/1097; H04L 67/104
See application file for complete search history.

(56) References Cited

U.S. PATENT DOCUMENTS

| | | | |
|---|---|---|---|
| 7,571,344 B2 | 8/2009 | Hughes et al. | |
| 7,620,841 B2 | 11/2009 | Chen et al. | |
| 7,647,544 B1 | 1/2010 | Masiewicz | |
| 7,873,878 B2 | 1/2011 | Belluomini et al. | |
| 8,194,340 B1 | 6/2012 | Boyle et al. | |
| 8,194,341 B1 | 6/2012 | Boyle | |
| 8,365,057 B2 | 1/2013 | Goldenberg et al. | |
| 8,386,835 B2 | 2/2013 | Dilger et al. | |
| 9,894,141 B2 | 2/2018 | Hesselink et al. | |
| 10,552,085 B1 * | 2/2020 | Chen | G06F 3/061 |
| 2006/0136619 A1 | 6/2006 | Edirisooriya | |
| 2009/0210770 A1 | 8/2009 | DeCusatis et al. | |
| 2010/0146203 A1 * | 6/2010 | Stevens | G11B 20/1833 711/112 |
| 2011/0131467 A1 | 6/2011 | Weathers | |
| 2012/0054436 A1 | 3/2012 | Duvvuru | |
| 2013/0055053 A1 | 2/2013 | Butt et al. | |
| 2019/0004888 A1 * | 1/2019 | Chagam Reddy | G06F 11/0709 |
| 2019/0058760 A1 * | 2/2019 | Sherkin | H04L 67/104 |

OTHER PUBLICATIONS

Bates, Donard: NVM Express for Peer-2-Peer between SSDs and other PCIe Devices, Storage Developer Conference, Santa Clara, CA, 2015 (http://www.snia.org/sites/default/files/SDC15_presentations/nvme_fab/StephenBates_Donard_NVM_Express_Peer-2_Peer.pdf).

Drobo Transporter 2.0 Private Peer-to-Peer Cloud Storage Drive, Drobo creator announces Transporter, the private cloud storage solution, bit-tech, May 28, 2013 (https://www.bit-tech.net/news/transporter-private-cloud-storage-drobo-cre/1/).

Hasan et al., "A Survey of Peer-to-Peer Storage Techniques for Distributed File Systems," 2004 (http://courses.cs.vt.edu/cs5204/fall08-kafura/Papers/FileSystems/Survey.pdf).

T10 Protection Information (PI) standard, ANSI T10 Technical Committee on SCSI Storage Interfaces, 2012 (https://www.seagate.com/files/staticfiles/docs/pdf/whitepaper/safeguarding-data-from-corruption-technology-paper-tp621us.pdf).

* cited by examiner

PEER STORAGE DEVICES SUPPORTING PROTECTION INFORMATION

TECHNICAL FIELD

The present disclosure generally relates to data storage systems, and in a more particular example, to data storage systems supporting end-to-end data protection standards using data integrity fields, such as the T10 Protection Information standard.

BACKGROUND

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

Some multi-device storage systems employ storage devices capable of communicating with one another over the interconnecting fabric. In some cases, these storage devices may be capable of peer-to-peer communication without the involvement of a storage management plane, such as a storage controller, as an intermediary. These peer storage devices may be capable of exchanging messages and/or transferring host data across the interconnecting fabric Some storage systems may implement standards and/or proprietary solutions for protecting the integrity of host data as it moves between application and storage systems. While storage devices and data transmission protocols may implement data integrity solutions, such as error correcting codes (ECC) and cyclic redundancy checks (CRC) to prevent bit errors, bit errors that are undetectable to device and/or transmission-level integrity checks may still occur across the input/output (I/O) path between systems. As such, end-to-end data integrity protection solutions that span device and transport boundaries have been developed.

One approach to end-to-end data integrity protection has been the use of data integrity fields defined by the T10 subcommittee of the International Committee for Information Technology Standards. Data integrity fields add 8 bytes of data protection information to data blocks, such as extending 512 byte blocks to 520 bytes. A common standard for using data integrity fields is the T10 Protection Information standard, also referred to as End-to-end Data Protection (EDP) or the Data Protection Model.

The end-to-end data protection information in the data integrity fields appended to the host data may include a guard field, an application tag, and a reference tag. The guard field is a two-byte CRC on the data in the data block to verify the integrity of the data in the block. The application tag is a two-byte field used by the application to add additional checking information to each data block at the application level, such as RAID information. The reference tag is a four-byte field that contains the logical block address information for the data block and may be used to check that the correct block or blocks have been sent in the correct order. Each system, such as host controllers, RAID/storage controllers, and storage devices may include logic for checking received data and reporting errors based on the data integrity fields.

Peer-to-peer storage device transfers of host data, particularly transfers that are not initiated by a host controller and/or RAID/storage controller may present challenges for implementing end-to-end data protection information. Data transfers that do not pass through host and/or storage controller systems may result in missing or legitimately changed data integrity fields.

Therefore, there still exists a need for peer storage systems that implement end-to-end data protection information.

SUMMARY

Various aspects for host data storage on peer storage devices implementing protection information in stored and transferred data blocks are described. In an innovative aspect, a storage system comprises a first storage device, a second storage device, and a peer communication channel. The first storage devices is configured to execute data operations with a protection information data block format. A first check code engine is configured to calculate a first data check value for a guard tag format associated with the protection information data block format. A first guard tag comparator is configured to compare a guard tag value to the first data check value calculated by the first check code engine for a target data block. A first reference tag comparator is configured to compare a source verification reference tag value to a source data block reference tag value for the target data block stored in the first storage device. The reference tag format is associated with the protection information data block format. The second storage device configured to execute data operations with the protection information data block format. A second check code engine is configured to calculate a second data check value for the guard tag format associated with the protection information data block format. A second guard tag comparator is configured to compare the guard tag value to the second data check value calculated by the second check code engine for the target data block. A second reference tag comparator configured to compare a destination verification reference tag value to a destination data block reference tag value for the target data block. The destination verification reference tag value is received from the first storage device. The peer communication channel from the first storage device to the second storage device is configured to transfer command messages and data blocks between the first storage device and the second storage device. The destination verification reference tag value and the target data block are transferred from the first storage device to the second storage device through the peer communication channel.

In various embodiments, a protection information handler may be configured to identify a media storage format of the first storage device. The media storage format may correspond to a non-supporting format if data blocks stored to a storage medium in the first storage device are not formatted with the protection information data block format. A reference tag generator may be configured to generate the data block reference tag value from logical block mapping information associated with the target data block if the media storage format is the non-supporting format.

In some embodiments, a command handler may be configured to receive a data operation command that uses the protection mapping data block format for transferring the target data block between the first storage device and the second storage device. The data operation command may include the source verification reference tag value and the destination verification reference tag value. The data operation command may not include the destination verification reference tag value and a reference tag generator may be configured to generate the destination verification reference tag value from logical block mapping information associated with the target data block in the second storage device. The data operation command may include an application tag value for an application tag format associated with the protection information data block format and the peer communication channel may be configured to transfer the application tag value from the first storage device to the second storage device. The data operation command may not include an application tag value for an application tag format associated with the protection information data block format and the first storage device may be configured to read the application tag value from the target data block in the first storage device.

In another innovative aspect, a computer-implemented method for execution by peer storage devices supports use of protection information. A data operation command is received that uses a protection information data block format for transferring a target data block between a first storage device and a second storage device. A first local data operation is executed based on the data operation command to operate on the target data block in the first storage device. A source verification reference tag value is compared to a source data block reference tag value for the target data block stored in the first storage device. The reference tag format is associated with the protection information data block format. A destination verification reference tag value and the target data block are transferred from the first storage device to the second storage device through a peer communication channel. The destination verification reference tag value is compared to a destination data block reference tag value for the target data block. A second local data operation is executed based on the data operation command to operate on the target data block in the second storage device.

In various embodiments, a media storage format of the first storage device may be identified. The media storage format may correspond to a non-supporting format if data blocks stored to a storage medium in the first storage device are not formatted with the protection information data block format. The data block reference tag value may be generated from logical block mapping information associated with the target data block if the media storage format is the non-supporting format. The data operation command may include the source verification reference tag value and the destination verification reference tag value. The data operation command may not include the destination verification reference tag value and the destination verification reference tag value may be generated from logical block mapping information associated with the target data block in the second storage device.

In some embodiments, the data operation command may include an application tag value for an application tag format associated with the protection information data block format. The application tag value may be transferred from the first storage device to the second storage device through the peer communication channel. The data operation command may not include the application tag value for the application tag format associated with the protection information data block format and the application tag value may be generated from the target data block in the first storage device.

In yet another innovative aspect, a storage device comprises at least one storage medium and various means. Means are provided for executing a first local data operation based on a data operation command to operate on a target data block in the at least one storage medium. Means are provided for calculating a first data check value for a guard tag format associated with a protection information data block format. Means are provided for comparing a guard tag value to the first data check value for the target data block. Means are provided for comparing a source verification reference tag value to a source data block reference tag value for the target data block stored in the at least one storage medium. A reference tag format is associated with the protection information data block format. Means are provided for transferring a destination verification reference tag value and the target data block to a peer storage device through a peer communication channel.

In various embodiments, means may be provided for identifying a media storage format of the at least one storage medium. The media storage format may correspond to a non-supporting format if data blocks stored to the at least one storage medium are not formatted with the protection information data block format and means may be provided for generating the data block reference tag value from logical block mapping information associated with the target data block if the media storage format is the non-supporting format. Means may be provided for receiving a data operation command that uses the protection information data block format be for transferring the target data block between the at least one storage medium and the peer storage device.

In some embodiments, the data operation command may include the source verification reference tag value and the destination verification reference tag value. The data operation command may not include the destination verification reference tag value and means may be provided for generating the destination verification reference tag value from logical block mapping information associated with the target data block in the peer storage device.

In some embodiments, the data operation command may include an application tag value for an application tag format associated with the protection information data block format. Means may be provided for transferring the application tag value to the peer storage device. The data operation command may not include the application tag value for the application tag format associated with the protection information data block format and means may be provided for reading the application tag value from the target data block in the at least one storage medium.

In yet another innovative aspect, a storage system comprises a first storage device, a second storage device, and a peer communication channel. The first storage device is configured to execute data operations with a protection information data block format. A first check code engine is configured to calculate a first data check value for the protection information data block format. A first protection information comparator is configured to compare a first protection information tag value to the first data check value calculated by the first check code engine for a target data block. The second storage device is configured to execute data operations with the protection information data block format. A second check code engine is configured to calculate a second data check value for the protection information data block format. A second protection information comparator is configured to compare a second protection information tag value to the second data check value calculated by the second check code engine for the target data block. The peer communication channel from the first storage device to the second storage device is configured to transfer command messages and data blocks between the first storage device and the second storage device. At least one destination verification protection information tag value and the target data block are transferred from the first storage device to the second storage device through the peer communication channel.

The various embodiments advantageously apply the teachings of peer storage systems to improve the functionality of such computer systems. The various embodiments include operations to overcome or at least reduce the issues in the previous storage systems discussed above and, accordingly, are more reliable and scalable than other computer data storage architectures for some applications. That is, the various embodiments disclosed herein include hardware and/or software with functionality to improve the reliability and scalability of storage systems, based on managing protection information among peer storage devices during peer storage transfers. Accordingly, the embodiments disclosed herein provide various improvements to storage systems.

It should be understood that language used in the present disclosure has been principally selected for readability and instructional purposes, and not to limit the scope of the subject matter disclosed herein.

DETAILED DESCRIPTION

Figure 1:
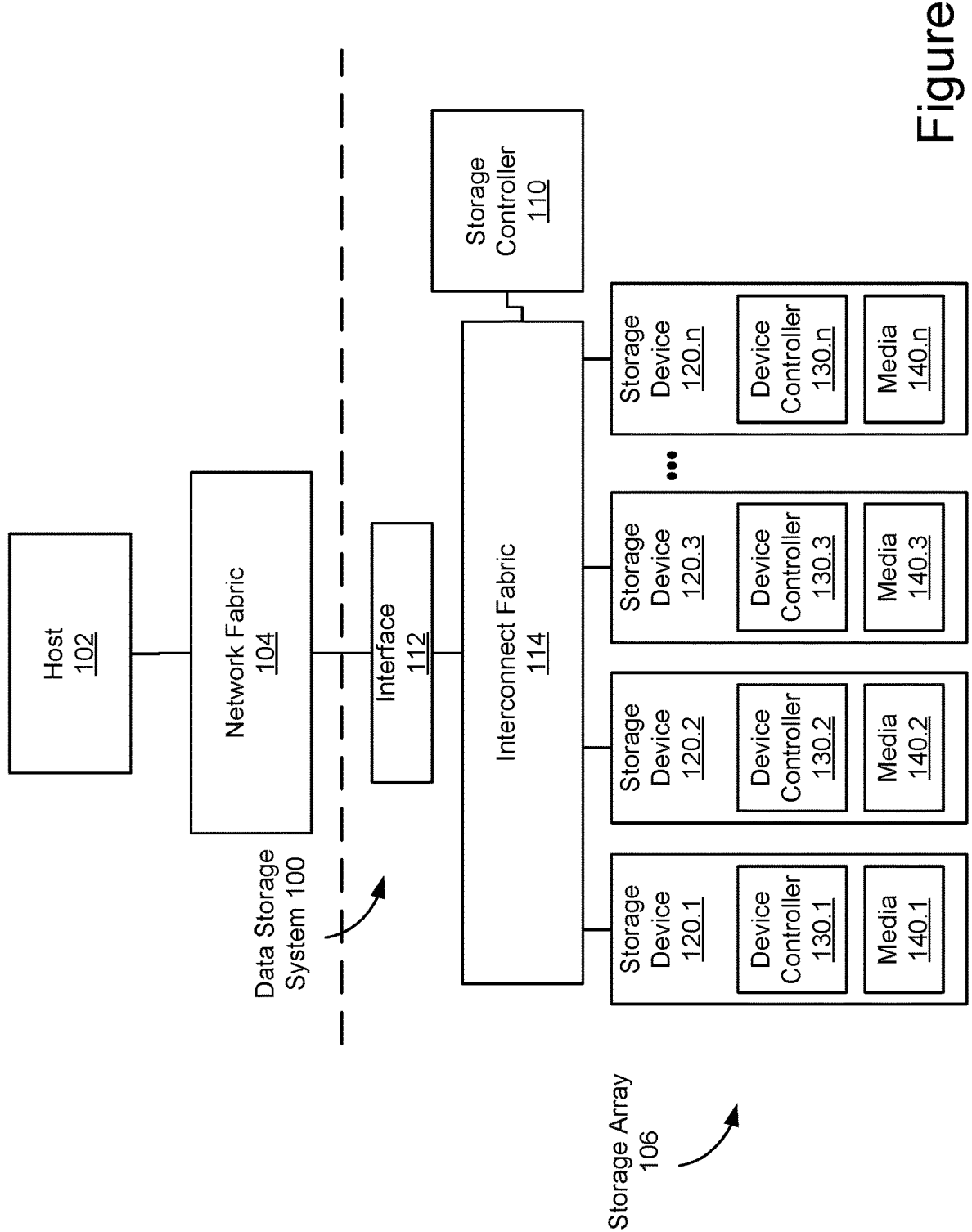
FIG. 1 schematically illustrates an example of a peer storage system.

FIG. 1 shows an embodiment of an example data storage system 100. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, or memory devices).

In some embodiments, the data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels).

In some embodiments, a respective data storage device 120 may include a single media device 140 while in other embodiments the respective data storage device 120 includes a plurality of media devices. In some embodiments, media devices include NAND-type flash memory or NOR-type flash memory. In some embodiments, data storage device 120 includes one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

Storage controller 110 is coupled to data storage devices 120.1-120.n through interconnect fabric 114. However, in some embodiments, storage controller 110 may be hosted as a component and/or a subsystem of another component of data storage system 100. For example, in some embodiments, some or all of the functionality of storage controller 110 may be implemented by software executed on one or more compute resources in at least one of data storage devices 120.1-120.n, interconnect fabric 114, or interface 112. Storage controller 110 is sometimes called a controller system, a main controller system, a non-volatile memory express (NVMe) controller, garbage collection (GC) leader, or storage virtualization controller (SVC). In some embodiments, a device controller 130.1 associated with a particular storage device (e.g., 120.1) acts as storage controller 110 for other storage devices (e.g., 120-2, 120-3, and 120.n) in data storage system 100. In some embodiments, storage controller 110 is a component and/or subsystem of host 102 (described below).

In some embodiments, host 102 is coupled to data storage system 100 through interface 112 over a network fabric 104. In some embodiments, multiple hosts 102 (only one of which is shown in FIG. 1) are coupled to data storage system 100 through interface 112, which may be a storage network interface or other interface capable of supporting communications with multiple hosts 102. Network fabric 104 may include a wired and/or wireless network (e.g., public and/or private computer networks in any number and/or configuration) which may be coupled in a suitable way for transferring data. For example, network fabric 104 may include any means of a conventional data communication network such as a local area network (LAN), a wide area network (WAN), a telephone network, such as the public switched telephone network (PSTN), an intranet, the internet, or any other suitable communication network or combination of communication networks.

Host 102, or a respective host in a system having multiple hosts, may be any suitable computer device, such as a computer, a laptop computer, a tablet device, a netbook, an internet kiosk, a personal digital assistant, a mobile phone, a smart phone, a gaming device, a computer server, or any other computing device. Host 102 is sometimes called a host system, client, or client system. In some embodiments, host 102 is a server system, such as a server system in a data center. In some embodiments, the one or more hosts 102 are one or more host devices distinct from storage controller 110 and distinct from the plurality of storage devices 120; but in some other embodiments, the one or more hosts 102 include one of the storage devices 120 that has been configured to perform data processing operations and to send data storage commands to access data stored in the one or more storage devices 120. In some other embodiments, the one or more hosts 102 are configured to store and access data in the plurality of storage devices 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

The one or more device controllers 130, if included in a respective storage device 120, are coupled with storage controller 110 through interconnect fabric 114. Interconnect fabric 114 is sometimes called a data connection, but typically convey commands in addition to data, and optionally convey metadata, error correction information and/or other information in addition to data values to be stored in media devices 140 and data values read from media devices 140.

In some embodiments, however, storage controller 110, the one or more device controllers 130, and media devices 140 are included in the same device (i.e., an integrated device) as components thereof. Furthermore, in some embodiments, one or more of the storage devices 120 (e.g., including storage controller 110, the one or more device controllers 130, and media devices 140) are embedded in a host device (e.g., host 102), such as a mobile device, tablet, other computer or computer-controlled device, and the methods described herein are performed, at least in part, by the embedded storage controller. In some embodiments, device controllers 130 are configured to both control one or more media devices 140 and provide distributed storage controller functions in conjunction with storage controller 110.

In some embodiments, storage devices 120 include a plurality of media devices 140, such as flash memory devices, and optionally includes fewer device controllers 130. Viewed another way, in some embodiments, a storage device 120 includes multiple memory channels, each of which has a device controller 130 and a set of media devices 140 coupled to the device controller 130. However, in some embodiments, two or more memory channels share a device controller 130. In either example, each memory channel has its own distinct set of media devices 140. In a non-limiting example, the number of memory channels in a typical storage device is 8, 16, or 32. In another non-limiting example, the number of media devices 140 per memory channel is typically 8, 16, 32, or 64. Furthermore, in some embodiments, the number of media devices 140 in one memory channel is different from the number of media devices in another one of the memory channels.

In some embodiments, each device controller of device controllers 130 includes one or more processing units (also sometimes called CPUs or processors or microprocessors or microcontrollers) configured to execute instructions in one or more programs (e.g., in device controllers 130). In some embodiments, the one or more processors are shared by one or more components within, and in some cases, beyond the function of device controllers 130. As noted above, media devices 140 are coupled to device controllers 130 through connections that typically convey commands in addition to data, and optionally convey metadata, error correction information and/or other information in addition to data values to be stored in media devices 140 and data values read from media devices 140. Media devices 140 may include any number (i.e., one or more) of memory devices including, without limitation, non-volatile semiconductor memory devices, such as flash memory device(s).

Flash memory device(s) (e.g., media devices 140) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) (e.g., media devices 140) can also be configured for relatively smaller-scale applications such as personal flash drives or hard-disk replacements for personal, laptop, and tablet computers. Although flash memory devices and flash controllers are used as an example here, in some embodiments storage device(s) 120 include other non-volatile memory device(s) and corresponding non-volatile storage controller(s).

In some embodiments, media devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

Figure 2:
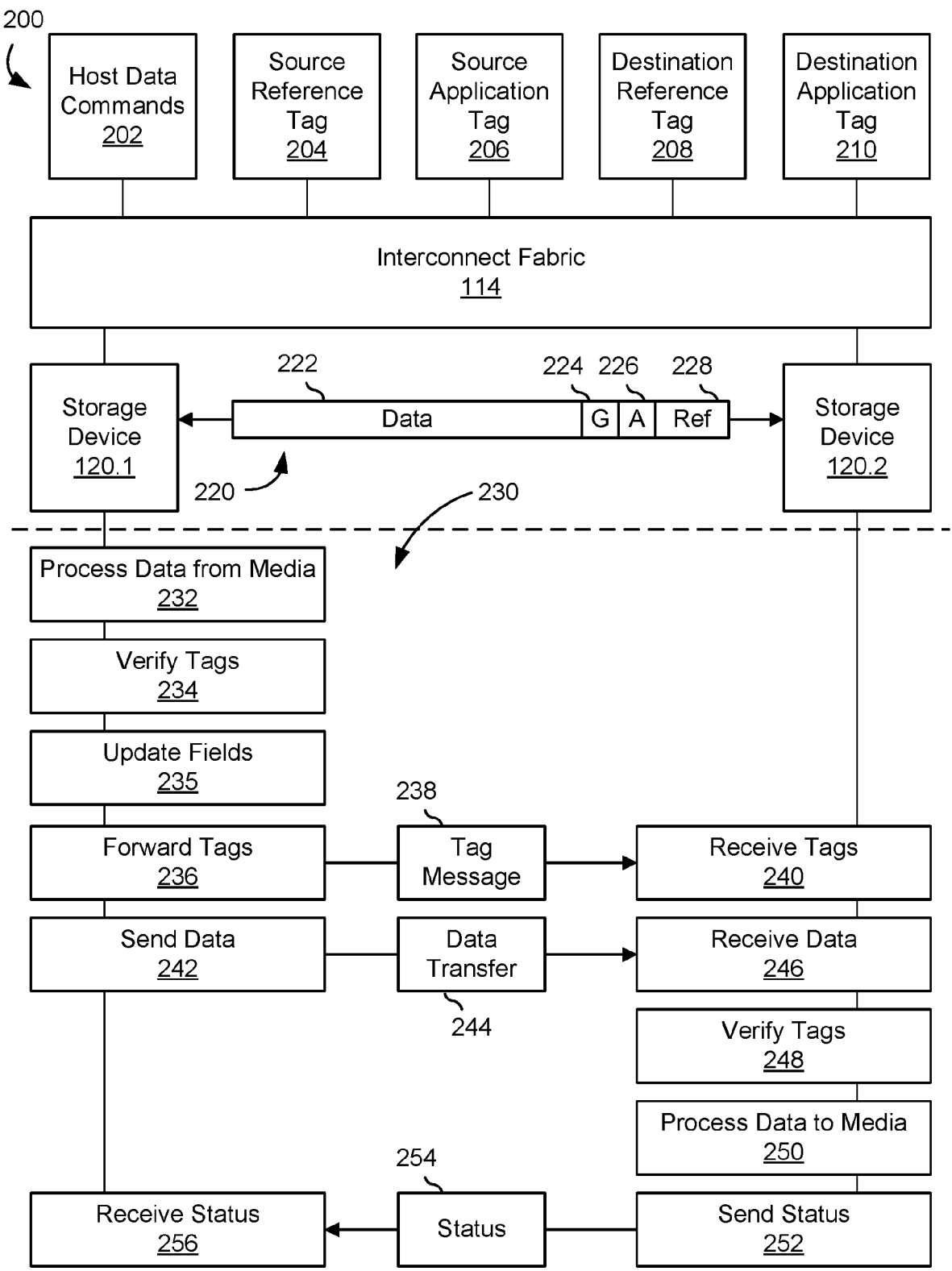
FIG. 2 schematically illustrates an example peer transfer configuration with protection information for the peer storage system of FIG. 1.

FIG. 2 is a block diagram illustrating an example peer data transfer 230 in response to host communication 200 for the data storage system 100, in accordance with some embodiments, as shown in FIG. 1. In the example shown, storage devices 120.1 and 120.2 are configured for extended data blocks 220 to be transferred between their respective storage media with protection information, such as data integrity fields. Storage devices 120.1 and 120.2 may communicate with each other through interconnect fabric 114. In some embodiments, interconnect fabric 114 may provide a peer communication channel between storage devices 120.1 and 120.2. For example, storage devices 120.1 and 120.2 may be able to address packetized messages to one another using their respective storage device identifiers and/or access remotely addressable memory locations (within storage devices 120.1 and 120.2, another peer storage device, or another location).

In some embodiments, extended data blocks 220 may include protection information appended to host data 222 or another data payload. For example, protection information may include one or more protection information tag values that comply with one or more general or proprietary standards for end-to-end protection information. In some embodiments, host data 222 may have a host data length conforming to a data block size definition for host 102 and/or storage devices 120.1 and 120.2. For example, host data 222 may support 512 byte data blocks. In some embodiments, formats with larger data block size, such as 4 KB (or 4,096 byte) or larger may be supported.

In some embodiments, protection information tags may include a guard field 224, an application tag field 226, and a reference tag field 228. Each of fields 224, 226, 228 may include assigned values for use in verifying or authenticating that the correct data is being received, sent, stored, and/or read. In some embodiments, guard field 224 may be a two-byte CRC on host data 222 to verify the integrity of the data in the block. Application tag field 226 may be a two-byte field for additional verification information for each data block at the application level. For example, two-byte codes or other identifiers may be assigned by a host application and may include a combination of flags, encoded parameters, and/or identifiers for a specific application, function, or storage configuration, such as RAID information. Reference tag field 228 may be a four-byte field that contains the logical block address information for host data 222. For example, the reference tag value may be used to check that the correct block or blocks have been sent in the correct order. In some embodiments, guard field 224, application tag field 226, and reference tag field 228 may comply with the T10 Protection Information standard.

Storage devices 120.1 and 120.2 may be configured to receive host data commands 202, such as host read operations, host write operations, host copy operations, host erase operations, and data management operations. Storage devices 120.1 and 120.2 may execute those operations, generally with regard to their respective storage media or other storage device resources (such as non-volatile cache, operating memory, processors, or other specialized hardware/software). In some embodiments, host data commands 202 may originate with host 102 and may be routed through storage controller 110.

Host data commands 202 may be received by storage devices 120.1 or 120.2 and provide parameters for moving extended data block 220 from one storage device to the other. For example, storage device 120.1 may receive an XCOPY command via host data commands 202 that identifies a data block stored on storage device 120.1 (such as by reference to a host LBA for the data block) and a storage location on storage device 120.2.

In some embodiments, host data commands 202 may be accompanied by one or more verification tag values 204, 206, 208, 210. For example. host data commands 202 may include, be accompanied by, and/or reference a source reference verification tag value 204 and/or a source application verification tag value 206 for verifying protection information on the storage device from which data is being read, such as storage device 120.1. Host data commands 202 may include, be accompanied by, and/or reference a destination reference verification tag value 208 and/or a destination application verification tag 210 for verifying protection information on the storage device to which data is being written, such as storage device 120.2. In some embodiments, verification tags may correlate to expected values of application tag field 226 and/or reference tag field 228 in the data operation(s) associated with host data commands 202.

In some embodiments, not all verification tag values 204, 206, 208, 210 may be received for any given host command. For example, a host command may be received that includes only source reference tag 204 and source application tag 206 and not destination reference tag 208 or destination application tag 210. In some embodiments, host data commands may be received with no verification tag values and/or any combination of incomplete tag values and peer data transfer 230 may still be executed by storage device 120.1 and 120.2.

In some embodiments, peer data transfer 230 may include a number of processes for verifying guard field 224, application tag field 226, and/or reference tag field 228 during a peer-to-peer data transfer between storage device 120.1 and 120.2. In some embodiments, data transfers may be made in either direction between storage device 120.1 and 120.2, as well as with other peer storage devices in communication with storage devices 120.1 and 120.2. In the example shown, the data transfer is being made from storage device 120.1 as the source storage device to storage devices 120.2 as the destination storage device. In the example shown, a complete set of tags, including verification tag values 204, 206, 208, 210, may have been received with the relevant host data command from host data commands 202.

In the example shown, peer data transfer 230 may complete without error, meaning that each verification of tag values 204, 206, 208, 210 and fields 224, 226, and 228 returned a positive result for a match between tag values, field values, and/or calculated values, such as CRC calculations for verifying guard field 224. In other example operations, one or more verifications may result in a value mismatch or other error that suggests host data 222 may not have been correctly transferred and its integrity cannot be verified. In such an event, error messages may be returned from storage device 120.2 to storage device 120.1 and/or to host 102 or another system sending or forwarding the relevant host data command. In some embodiments, the specific verification mismatch and stage in the transfer process may be identified and included in the error message and/or any resulting status message. In some embodiments, one or more errors may trigger additional actions, such as a resend or retry path for the original host data command, related verification tags, and/or the peer data transfer itself.

At block 232, storage device 120.1 may use parameters provided in host data commands 202 to initiate a data operation from its media (such as storage media 140.1 in FIG. 1). For example, an XCOPY command may identify one or more host LBAs stored on storage device 120.1 for transfer to storage device 120.2. In some embodiments, storage device 120.1 may process a local read command from its storage media to retrieve a host data block. For example, storage device 120.1 may store host data blocks in accordance with a protection information standard, such that each block of host data 222 is stored continuously with protection information fields 224, 226, and 228 and the read command processed by storage device 120.2 may return both the stored host data 222 and guard field 224, application tag field 226, and reference tag field 228.

At block 234, the protection information field values may be compared to the received source reference tag 204 and source application tag 206 to verify the integrity of the data read from the storage media. For example, guard field 224 may be verified against a CRC calculation performed on host data 222, the read value for application tag field 226 may be verified against source application tag 206, and the read value for reference tag field 228 may be verified against source reference tag 204. In some embodiments, verification may include a bit-by-bit match of the corresponding field and tag values. Any bit that does not match may generate an error. In the event of an error, an error message and/or error process may be initiated and the data transfer operation may be suspended or cancelled.

At block 235, one or more of protection information fields 224, 226, and 228 may be updated with new values for use in destination verification. For example, the destination reference tag 208 value may replace the prior value for reference tag field 228 and the destination application tag 210 value may replace the prior value for application tag field 226. In some embodiments, the data operation of storage device 120.1 may include changes to host data 222 and/or generation of new host data 222 based on the original host data 222 and an updated guard field 224 may be calculated and updated prior to the data transfer. For example, a read/modify/write or generation of a parity block for transfer to storage device 120.2 may change host data 222. In some embodiments, these changes to the extended data block 220 may be made in a buffer memory in storage device 120.1 in preparation for the data transfer to storage device 120.2.

At block 236, the destination tags may be forwarded from storage device 120.1 to storage device 120.2 in a tag message 238. For example, destination reference tag 208 and destination application tag 210 that may have been received by storage device 120.1 may be provided in a command message, metadata, session variable, and/or remotely accessible log used for communication between peer storage devices. The tags may be received by storage device 120.2 at block 240.

At block 242, the extended data block 220 may be sent from storage device 120.1 to storage device 120.2 as a data transfer 244. For example, extended data block 220 may be written from a remotely addressable memory in storage device 120.1 to a remotely addressable memory in storage device 120.2 using a peer data transfer protocol through interconnect fabric 114. Data transfer 244 may include the updated extended data block 220 that was generated by the updates to protection information fields 224, 226, 228 at block 235. Extended data block 220 may be received at storage device 120.2 at block 246.

At block 248, the protection information field values may be compared to the received destination reference tag 208 and destination application tag 210 to verify the integrity of the data transferred from storage device 120.1 to storage device 120.2. For example, guard field 224 may be verified against a CRC calculation performed on host data 222, the received value for application tag field 226 may be verified against destination application tag 210, and the received value for reference tag field 228 may be verified against destination reference tag 208. In some embodiments, verification may include a bit-by-bit match of the corresponding field and tag values. Any bit that does not match may generate an error. In the event of an error, an error message and/or error process may be initiated and the data transfer operation may be suspended or cancelled.

At block 250, the extended data block is processed to the storage media of storage device 120.2 in accordance with the host data commands 202. For example, the extended data block 220 received in data transfer 244 may be stored to media devices 140.2 of storage device 120.2. In some embodiments, further data operations may be performed by storage device 120.2 prior to media storage and updates to one or more protection information fields 224, 226, 228 may be made prior to storing to storage media.

At block 252, a data operation complete or similar status message 254 may be sent by storage device 120.2 and received by storage device 120.1 at block 256. In some embodiments, storage device 120.1 may in turn provide a status message back to host 102 or another system related to host data commands 202. In some embodiments, the return status message may include tag values corresponding to protection information fields 224, 226, 228 as written to the storage media of storage device 120.2.

Figure 3:
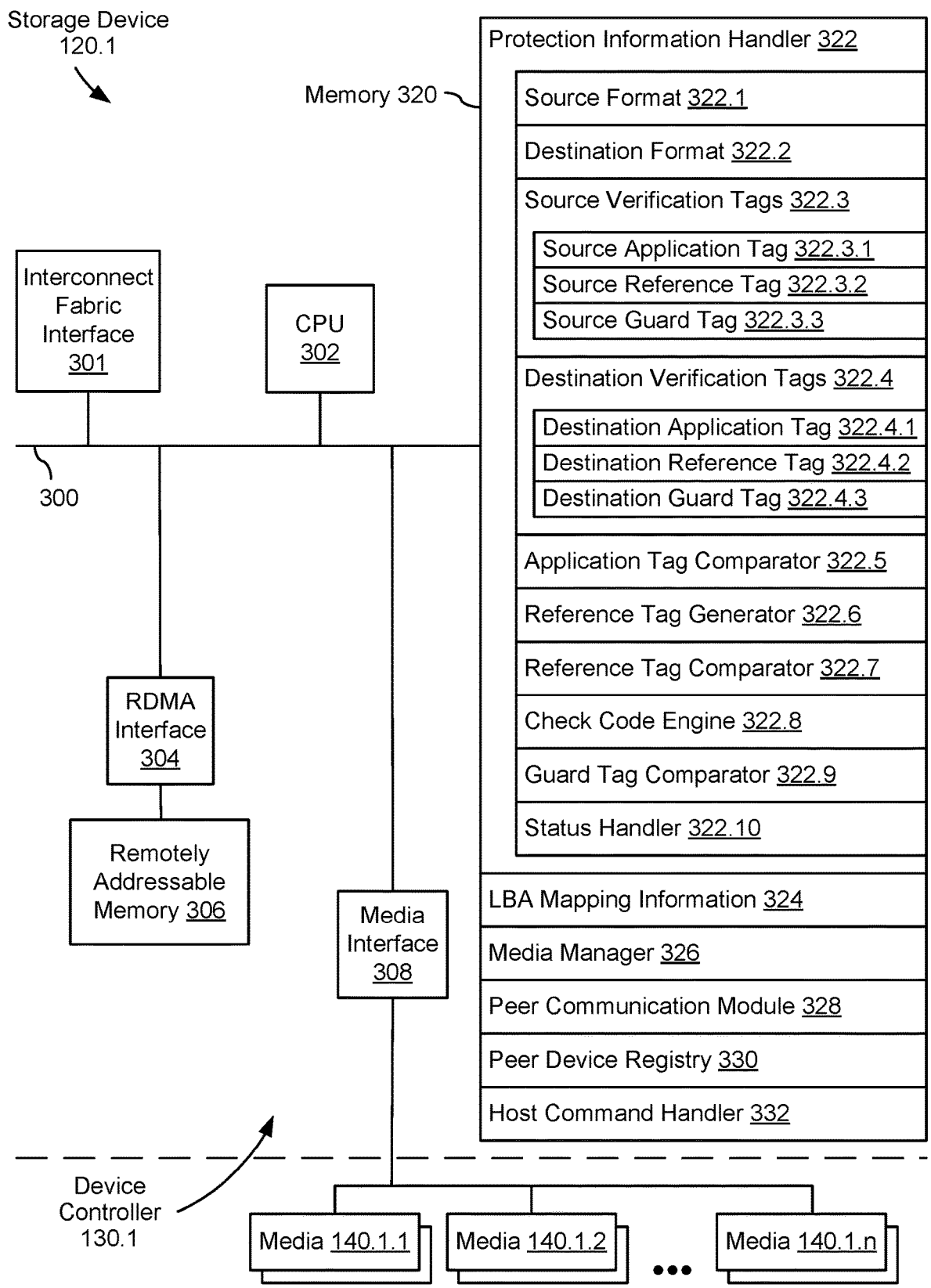
FIG. 3 schematically illustrates an example of a storage device of the peer storage system of FIG. 1.

In some embodiments, as shown in FIG. 3, a storage device 120.1 includes the functions of a device controller 130.1 and protection information handler 322 using common compute resources, such as one or more processing units (CPUs 302), sometimes herein called CPU, processors, or hardware processors, and sometimes implemented using microprocessors, microcontrollers, or the like, configured to execute instructions in one or more programs (e.g., the modules in memory 320). In some embodiments, the one or more CPUs 302 are shared by one or more components within, and in some cases, beyond the function of storage device 120. The modules in memory 320 and executed by CPU 302 may be coupled to interconnect fabric interface 301, RDMA interface 304, media interface 308, and any number of additional modules, such as erasure coding engines, error correction engines, specialized memory modules, etc., in order to coordinate the operation of these components. In some embodiments, the components of storage device 120.1 may be interconnected by one or more communication buses 300. In some embodiments, CPU 302, memory 320, media interface 308, and any number of additional modules may be packaged as a device controller 130.1, such as an NVM controller, implemented in an application-specific integrated circuit (ASIC), system on a chip (SoC), field programmable gate array (FPGA), or similar architecture.

Storage device 120.1 may include a variety of local memory resources and local compute resources. In some embodiments, local resources may include components that are integrated into storage device 120.1 and may scale with the number of storage devices. Example local memory resources may include memory 320 (e.g. the operating memory of media controller 130.1), remotely addressable memory 306 (e.g. remotely addressable memory available through a remotely addressable interface), and other specialized memory (not shown). In some embodiments, storage media, such as media devices 140, may provide local memory resources for data management functions, but these may be distinct from storage locations for host data. Example local compute resources may include CPU 302 (e.g. the operating processor of device controller 130.1), erasure coding engines, error correction engines, and any other specialized processing systems. In some embodiments, one or more interfaces, such as interconnect fabric interface 301 or RDMA interface 304, may also include or utilize memory and/or compute resources and may be part of the available local resources of storage device 120.1.

In some embodiments, RDMA interface 304 may be a hardware, software, or combined hardware/software engine for providing remote data management access to remotely addressable memory 306. This may include local direct memory access (DMA) to remotely addressable memory 306 for CPU 302 or other components of device controller 130.1. The RDMA engines of RDMA interface 304 may allow storage device 120.1 to push or pull data from/to remotely addressable memory 306 and to/from memory locations in other storage devices, storage controllers (e.g. storage controller 110), or servers (e.g. host 102).

Additional modules (not shown) supporting one or more functions of storage device 120 may be connected to CPU 302, RDMA interface 304, media interface 308, and memory 320. In some embodiments, additional module(s) are executed in software by the CPU 302; in other embodiments, additional module(s) are implemented in whole or in part using special purpose circuitry (e.g., to perform encoding and decoding functions).

In some embodiments, during a write operation initiated by a host 102, storage controller 110 receives a host write command (e.g., in a set of one or more host write commands) via interface 112 (FIG. 1), translates that host write command into a write command, sometimes called a translated command or translated write command, suitable for execution by a data storage device 120, and sends the translated host data command to one or more data storage devices corresponding to one more addresses specified by the host write command, a destination storage device. In some embodiments, host data blocks in host write commands may be encoded in extended data blocks that include protection information.

In some storage systems, a storage controller also receives, via interface 112, data to be stored in the one or more data storage devices corresponding to the one more addresses specified by the host write command. A respective data storage device receives the data to be stored in its media devices 140.1.1-140.1.$n$, or a portion of the data to be stored, from the storage controller via the interconnect fabric 114. The data received by the storage device may be encoded or otherwise processed and made available to storage media interface 308, which transfers the data to media devices 140.1 in a manner dependent on the type of storage medium being utilized. In storage device 120, RDMA interface 304 and remotely addressable memory 306, sometimes in conjunction with coordination from storage controller 110, may allow host 102 to send the data to be stored in the host write command to remotely addressable memory 306 in storage device 120 without them passing through storage controller 110 or another storage controller.

In some embodiments, a storage media (e.g., media devices 140.1) is divided into a number of addressable and individually selectable blocks and each block is optionally (but typically) further divided into a plurality of pages and/or word lines and/or sectors, storage locations of defined storage unit sizes. While erasure of data from a storage medium is performed on a block basis, in many embodiments, reading and programming of the storage medium is performed on a smaller subunit of a block (e.g., on a page basis, word line basis, or sector basis). In some embodiments, host data block formats, such as 512 byte or 520 byte protection information data blocks, may or may not directly correlate to the programming block sizes for media devices 140.1 and storage devices 120.1 may manage aggregating continuous protection information data blocks across multiple writes to buffer space before writing to media in a larger media programming block.

In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called the fast page), and (2) an upper page (sometimes called the slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or ECC code) is a choice made when data is actually written to the storage media.

In addition, these various memory cell configurations and encoding formats may impact the lifetime performance of storage device 120.1. Flash memory may have defined I/O performance, endurance, write voltage thresholds, error rates, cell/device failures, and other parameters that may be tracked for specific performance values and/or contributions to storage capacity, performance class, endurance, and/or overall health. Similarly, cell usage, read and write load balancing, garbage collection, and other operations may be tracked for endurance, reliability, and failure prediction for media devices 140.

FIG. 3 is a block diagram illustrating tier management handled by storage device 120.1 and its peer storage devices 120, in accordance with some embodiments. Storage device 120.1 includes CPU 302 for executing modules, programs, and/or instructions stored in memory 320 and thereby performing processing operations, memory 320 (sometimes called NVM controller memory, device controller memory, or operating memory), and one or more communication buses 300 for interconnecting these components.

The one or more communication buses 300 optionally include circuitry (sometimes called a chipset) that interconnects and controls communications between system components. CPU 302 and memory 320 may be coupled to interconnect fabric interface 301, RDMA interface 304, remotely addressable memory 306, media interface 308, media devices 140.1, and any additional module(s) by the one or more communication buses 300. In some embodiments, interface hardware and/or protocols for providing communication through communication buses 300 may also be present for communication with any given component.

Memory 320 may include high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 320 may optionally include one or more storage devices remotely located from CPU 302. In some embodiments, one or more additional memories may be provided for specific functions, such as an FTL memory for flash translation layer (FTL) data, and/or remotely addressable memory 306. These functional memories may include specialized processing, hardware acceleration, and/or other resources related to their function. In some embodiments, remotely addressable memory 306 may be part of memory 320.

Memory 320, or alternatively the non-volatile memory device(s) within memory 320, comprises a non-transitory computer readable storage medium. In some embodiments, memory 320, or the non-transitory computer readable storage medium of memory 320 stores the following programs, modules, and data structures, or a subset or superset thereof:

protection information handler 322 for receiving, verifying, generating, and updating protection information fields associated with host commands, such as host commands from storage controller 110 or host 102, and peer-to-peer data operations LBA mapping information 324 for storing host LBA mapping information and/or storage media mapping information, including storage device FTL data media manager 326 for managing storage device FTL data (including logical address mapping) and related processes and requests, such as media read and write operations through media interface 308 to media devices 140.1.1-140.1.$n$;

peer communication module 328 for communicating command messages and data transfers between storage devices 120 through interconnect fabric interface 301, sometimes using access to remotely addressable memory 306, without the intervention of host 102, storage controller 110, or similarly distinct storage control plane systems;

peer device registry 330 for identifying the storage device identifiers of peer storage devices and/or storing other data management and/or hosted services information related to each other storage device;

host command handler 332 for receiving, parsing, and/or forwarding host data and/or related host data commands.

Each of the above identified elements may be stored in one or more of the previously mentioned memory devices that together form memory 320 and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 320 may store a subset of the modules and data structures identified above. Furthermore, memory 320 may store additional modules and data structures not described above. In some embodiments, the programs, modules, and data structures stored in memory 320, or the non-transitory computer readable storage medium of memory 320, provide instructions for implementing respective operations of the methods described below. In some embodiments, some or all of these modules may be implemented with specialized hardware circuits that subsume part or all of the module functionality.

Protection information handler 322 may receive, verify, generate, and update protection information fields in a protection information data block format, such as extended data block 220 in FIG. 2, as well as related guard, reference tag, and application tag values for verification. For example, protection information handler 322 may manage guard fields, reference tag fields, and application tag fields encoded with host data for peer data transfers, as well as verification tags received in host commands or that need to be generated to support peer data transfers. Protection information handler 322 may include one or more protection information comparators, such as application tag comparator 322.5, reference tag comparator 322.7, and guard tag comparator 322.9, for comparing received and/or calculated protection information to check data integrity. In some embodiments, protection information handler 322 may be configured to support a general or proprietary end-to-end data integrity model, such as the T10 Protection Information standard.

Protection information handler 322 may be configured to handle protection information for data transfers where either or both of the source storage device and the destination storage device may not encode protection information on their respective media devices. For example, storage device 120.1 or a peer storage device involved in a peer data operation may not support storage of 520 byte blocks on media devices 140. In some embodiments, protection information handler may include a source format 322.1 describing the media data block formatting constraints of the source storage device(s) for a data storage operation. In some embodiments, protection information handler may include a destination format 322.2 describing the media data block formatting constraints of the destination storage device(s) for a data storage operation. For example, one or more fields for describing media data formats may be included in peer device registry 330 and protection information handler 322 may access those fields to determine whether protection information data formats are supported at the media storage level in one or more storage devices involved in a data operation with protection information. In some embodiments, this may include a protection information format flag for each storage device in peer device registry 330 where a flag value indicates whether or not protection information fields are supported in the media format.

Protection information handler 322 may be configured to manage source verification tags 322.3 and destination verification tags 322.4 for data operations involving protection information. For example, for any given data operation, protection information handler 322 may allocate an array or other data structure for storing verification tag values for source verification tags 322.3 and destination verification tags 322.4. In some embodiments, protection information handler 322 may support greater than two storage devices (e.g. source and destination) for a given data operation and may identify verification tag information for any number of storage devices, such as using a table of verification tags for the source and destination drives involved in each atomic read or put/write operation.

In some embodiments, source verification tags 322.3 include source application tag 322.3.1, source reference tag 322.3.2, and source guard tag 322.3.3. In some embodiments, destination verification tags 322.4 include destination application tag 322.4.1, destination reference tag 322.4.2, and destination guard tag 322.4.3. In some embodiments, source application tag 322.3.1, source reference tag 322.3.2, destination application tag 322.4.1, and destination reference tag 322.4.2 may be received in a host data command or associated with a host data command. In some embodiments, one or more of source application tag 322.3.1, source reference tag 322.3.2, destination application tag 322.4.1, and destination reference tag 322.4.2 may not be provided in the host data command or there may be no host data command supporting a peer data operation. Protection information handler 322 may include logic for generating missing verification tags. In some embodiments, verification values for source guard tag 322.3.3 and destination guard tag 322.4.3 may be calculated from host data, such as using a CRC calculation and may not be received in host data commands.

In some embodiments, protection information handler 322 may include logic for using source format 322.1, destination format 322.2, source verification tags 322.3, and destination verification tags 322.4 to initially determine which verification tag values have been received from other sources (e.g. host commands) and which verification tag values may need to be generated. For example, protection information handler 322 may support a plurality of workflows depending on different combinations of media support, verification tags received, and types of data operations. Protection information handler 322 may identify an appropriate work flow and generate any missing verification tags that are needed to complete the verifications for the data operation. In some embodiments, missing application verification tags may be read from application tag fields in the source storage device and used as the destination application tag for subsequent verifications. Because application tag fields may be assigned at the application level, it may not be possible for storage device 120.1 to generate accurate application verification tags if they are not received from the host.

In some embodiments, application tag comparator 322.5 may evaluate a verification application tag, such as source application tag 322.3.1 or destination application tag 322.4.1, against an application tag field in an extended data block. For example, a data block read from media devices 140.1 or received through interconnect fabric interface 301 with protection information may be parsed to identify the value of the bytes corresponding to the application tag field. A selected verification application tag value may then be compared to the application tag field value in the data block to determine whether there is a match. If all bits match, application tag comparator 322.5 may return a valid response. If any bits do not match, application tag comparator 322.5 may return an error response. In some embodiments, no verification application tag may be available and application tag comparator 322.5 may be bypassed for an initial read operation. In some embodiments, an application tag field value read from media devices 140.1 may be stored as a verification application tag for future use, such as being stored to destination application tag 322.4.1.

In some embodiments, reference tag generator 322.6 may generate a verification reference tag value for use in reference tag field verification. For example, reference tag generator 322.6 may be used to generate source reference tag 322.3.2 and/or destination reference tag 322.4.2. In some embodiments, reference tag generator 322.6 may use host LBA information received in a host data command, retrieved from LBA mapping information 324, or accessed through one or more peer storage devices or storage controller LBA maps to generate a verification reference tag value. For example, reference tag values may be based on the LBA to which the data block is to be read from or stored to and the LBA may be formatted into a reference tag value based on a defined LBA representation. In some embodiments, destination reference tag 322.4.2 may be generated by reference tag generator 322.6 regardless of whether media devices 140.1 are the destination storage location by accessing host LBA information for the peer storage device that will be receiving the data block.

In some embodiments, reference tag comparator 322.7 may evaluate a verification reference tag, such as source reference tag 322.3.2 or destination reference tag 322.4.2, against a reference tag field in an extended data block. For example, a data block read from media devices 140.1 or received through interconnect fabric interface 301 with protection information may be parsed to identify the value of the bytes corresponding to the reference tag field. A selected verification reference tag value may then be compared to the reference tag field value in the data block to determine whether there is a match. If all bits match, reference tag comparator 322.7 may return a valid response. If any bits do not match, reference tag comparator 322.7 may return an error response.

In some embodiments, check code engine 322.8 may provide error code processing logic for calculating an error code associated with the host data block. For example, check code engine 322.8 may implement an ECC, CRC, or other error code scheme for verifying the absence of bit errors in the host data block. In some embodiments, check code engine 322.8 may calculate a 2 byte CRC value based on a 512 byte data block to be used for guard field verification. In some embodiments, a different configuration of error checking may be implemented to support alternate block sizes and/or protection information models. A guard field value calculated by check code engine 322.8 may be stored as a verification guard tag value, such as source guard tag 322.3.3 or destination guard tag 322.4.3.

In some embodiments, guard tag comparator 322.9 may evaluate a calculated guard value, such as source guard tag 322.3.3, destination reference tag 322.4.2, and/or a guard tag value output by check code engine 322.8, against a guard field in an extended data block. For example, a data block read from media devices 140.1 or received through interconnect fabric interface 301 with protection information may be parsed to identify the value of the bytes corresponding to the guard field. The calculated verification guard tag value may then be compared to the guard field value in the data block to determine whether there is a match. If all bits match, guard tag comparator 322.9 may return a valid response. If any bits do not match, guard tag comparator 322.9 may return an error response.

In some embodiments, protection information handler 322 may include a status handler 322.10 to communicate status information related to protection information verification to other functions and/or storage system components, such as peer storage devices. For example, status handler 322.10 may provide a verification complete or a verification error message to one or more other components in response to completing each of application tag comparator 322.5, reference tag comparator 322.7, and guard tag comparator 322.9. In some embodiments, status handler 322.10 may receive status messages from peer storage devices, such as a destination storage device, regarding protection information verification by the peer storage device. For example, protection information handler 322 may provide destination verification tags 322.4 to a peer storage device as part of a peer data transfer operation and receive a response status message when the relevant data block is received, verified, and stored.

In some embodiments, memory 320 may include LBA mapping information 324 for use in data operations to media devices 140.1 and/or managing host LBA information. For example, LBA mapping information 324 may include both media FTL mapping information for media devices 140.1 and portions of host FTL mapping information that may have otherwise been managed at the storage controller or host, such as access to and maintenance of a host FTL logical map stored. In some embodiments, the host FTL logical map may include a portion of a complete logical map for peer storage devices in data storage system 100, including LBA mapping information 324. LBA mapping information 324 may enable access to both host LBA information and media LBA information. Protection information handler 322 may access LBA mapping information 324 for reference tag generation and other functions.

In some embodiments, host FTL logical map may be allocated and/or organized by host LBA storage locations corresponding to a host write size, such as 520 byte extended data blocks. Storage device FTL map may be allocated and/or organized by media LBA storage locations corresponding to a media write or programming size that is a larger multiple of the host write size. For example, the media programming size may be set to a page programming size, such as a multiplane page size of 96K or 192K. Thus, the host block size may be smaller than the media block size by a factor depending on the relationship between the host write granularity and the page programming granularity.

In some embodiments, media manager 326 manages access to and maintenance of media devices 140.1. For example, media manager 326 may include base FTL services for storage device 120 and manages the storage device FTL map, as well as read, write, and data management access to media devices 140.1. Host commands involving host data reads, writes, erases, etc. may be directed by media manager 326 through media interface 308 for accessing media devices 140.1. In some embodiments, host data commands may be pre-processed by host command handler 332 and/or protection information handler 322, and related internal data access commands may be received by media manager 326. In some embodiments, storage device FTL provides a base level of FTL mapping for storage device 120.1. Storage device FTL may include allocation of storage locations with a defined size based on compatibility of with storage units in media devices 140.1, such as page size. For example, storage locations may be allocated as 4 KB or 8 KB pages. In some embodiments, allocation sizes for storage locations may correspond to larger multiplane NVM page sizes, such as 96 KB.

Media manager 326 may be responsible for bad block management, bad block spare overprovisioning, and allocation of gap free logical space throughout the life of the media devices 140.1. In some embodiments, media manager 326 may also include error correction (e.g., low-density parity-check (LDPC) or Bose-Chaudhuri-Hocquenghem (BCH) codes) supported by an error correction engine and tuning of NVM access parameter (e.g., read levels, programming thresholds, etc.). Media manager 326 may enable reads from logical block address (LBA) storage locations in media devices 140 to write in remotely addressable memory 306 and reads from remotely addressable memory 306 to writes in LBA storage locations in media devices 140.1. In some embodiments, media manager 326 does not manage any RAID-related redundancy or striping across the NVM under its management and RAID groups and striping may be managed across the storage devices in a distributed fashion.

In some embodiments, peer communication module 328 may provide communication among storage devices 120 using interconnect fabric 114 without being routed through a storage control plane for storage devices 120, such as storage controller 110 or another host or controller component. For example, peer communication module 328 may enable drive-to-drive messaging addressed by storage device identifiers, peer-drive broadcasts that provide the same message to all peer storage devices, and/or access to shared memory locations, such as remotely addressable memory 306 for direct data transfer and/or access of host and parity data, data management logs, etc. In some embodiments, packetized messages may be routed among storage devices 120.1 using one or more network communication protocols compatible with interconnect fabric 114.

In some embodiments, peer communication module 328 operates in conjunction with RDMA interface 304 to manage local and remote use of remotely addressable memory 306. For example, local operations by media manager 326 may include writes and reads to remotely addressable memory 306, read/write operations may include coordinated use of space in remotely addressable memory 306 for both local and remote access, and other distributed operations may use space in remotely addressable memory 306 as requested by storage controller 110 or other storage devices.

In some embodiments, peer device registry 330 may be a data structure for maintaining information regarding each other peer storage device in a peer group, such as storage devices 120 in tiered storage array 106. For example, peer device registry 330 may be a table, list, array, database, or similar data structure for storing storage device identifiers, other addressing information, storage device status indicators, and/or additional information on peer storage devices, such as specifications and/or parameters of the storage devices. In some embodiments, peer device registry 330 may include protection information format information for each peer storage device, such as whether or not protection information verification is supported and/or whether protection information may be written to peer media devices in extended protection information data block format.

In some embodiments, storage device 120.1 may include a host command handler 332 that receives host data commands and parses them for further processing by storage device 120.1, including protection information handler 322. For example, host command handler 332 may receive a host XCOPY command, determine the source data operation to be processed locally, and determine a peer storage device for the destination data operation. If protection information is enabled, protection information handler 332 may receive host data commands and/or corresponding data operations from host command handler 332 for processing according to protection information verification protocols. In some embodiments, host command handler 332 may also handle status messages back to the source of the host data command. For example, host command handler 332 may receive any error messages generated during protection information verification by protection information handler 322 and provide a corresponding host error message back to the host.

Figure 4:
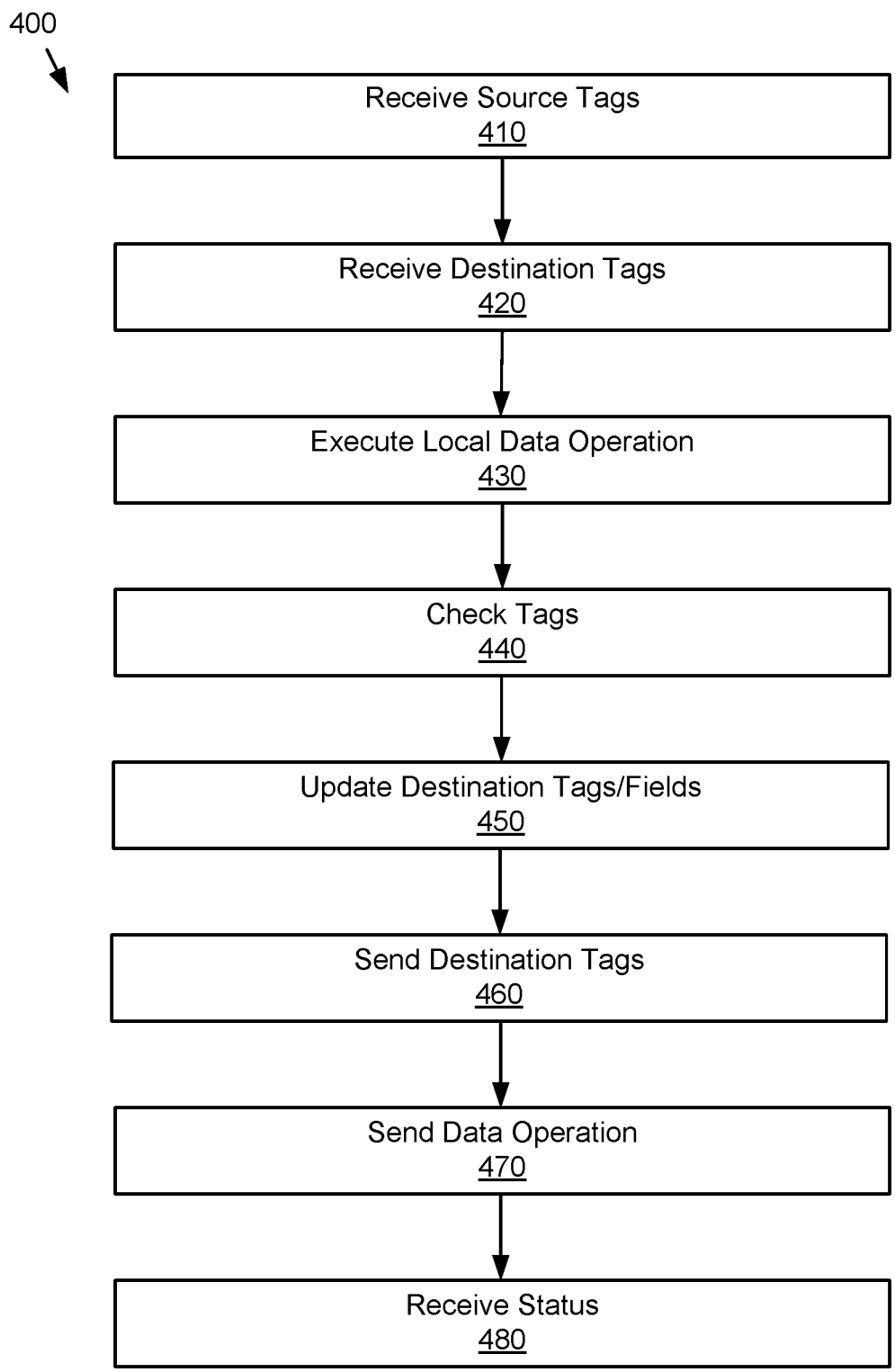
FIG. 4 illustrates an example of a method for a data operation with protection information to a peer storage device.

As shown in FIG. 4, storage device 120.1 operating within data storage system 100 may be operated according to peer data transfer operations for processing host data commands among peer data storage devices 120 in accordance with a protection information protocol. For example, storage device 120.1 may respond to one or more host data commands from a storage controller (e.g. storage controller 110), a host (e.g. host 102), and/or one or more peer storage devices (e.g. storage devices 120) to handle host data commands according to the method 400 illustrated by blocks 410-480 of FIG. 4.

At block 410, source verification tags may be received by a storage device. For example, source application tags and source reference tags may be received for verifying a protection information data block read from the receiving storage device and/or a peer storage device. In some embodiments, only partial source verification tags or no source verification tags may be received. In some embodiments, the received source verification tag values are written to memory locations for use in verification or transmission to a peer storage device.

At block 420, destination verification tags may be received by the storage device. For example, destination application tags and destination reference tags may be received for verifying protection information when a protection information data block is transferred and stored in a destination storage device. In some embodiments, only partial destination tags or no destination tags may be received. In some embodiments, the received destination verification tag values are written to memory locations for use in verification or transmission to a peer storage device. In some embodiments, source verification tags and destination verification tags may be received in the same operation, such as accompanying a host data command as a parameter, metadata, session variable, or other data source related to the host data command.

At block 430, a local data operation may be executed by the source storage device. For example, the storage device receiving the data command may include the referenced data block in its storage media and execute a local read or get operation to move the data block into buffer memory. In some embodiments, the local data operation may include additional processing of the read data block, such as modification, encoding, parity calculation, etc. If data processing would change the content of the data block, then a check tags process may be executed at block 440 prior to the data processing.

At block 440, the protection information tags in the read data block may be checked to verify data integrity. For example, a guard field value from the read data block may be checked against a calculated source guard tag value, reference tag field value from the read data block may be checked against a verification source reference tag value, and an application tag field value from the read data block may be checked against a verification source application tag value. If all field values from the read data block match their corresponding verification tag values, operation may proceed to block 450. Otherwise, one or more error messages may be generated.

At block 450, destination tags and/or fields may be selectively updated to support the data transfer to a peer storage device. For example, a data processing operation may change the host data and a new guard field may need to be calculated to overwrite the prior guard field or a change in host LBA for the destination storage location may be used to overwrite the prior reference tag field. In some embodiments, no changes to destination verification tags or read data fields may be required to support the data transfer.

At block 460, the destination verification tags may be sent to a peer storage device for receiving the data transfer. For example, the host data command may specify the destination storage location by storage device and/or host LBA and the storage device that received the host data command may forward the destination verification tags to the peer storage device using a peer communication channel.

At block 470, the peer data operation may be sent to the destination storage device. For example, the peer storage device may receive a data transfer command for reading the data block from a remotely addressable memory buffer in the storage device that received the host command and now contains the protection information data block for transfer. The peer data operation may include both peer data transfer parameters and destination storage location and/or other data processing parameters to be executed at the peer storage device.

At block 480, the storage device may receive a status message from the peer storage device. For example, when the peer storage device has completed the transfer, verification, processing (if necessary), and storage of the protection information data block, the peer storage device may return an operation complete message. In some embodiments, the status message may include protection information tag values for the completed data operations on the peer storage device. In the event that the peer storage device fails protection information verification or another aspect of the peer data operation, an error status message may be returned.

Figure 5:
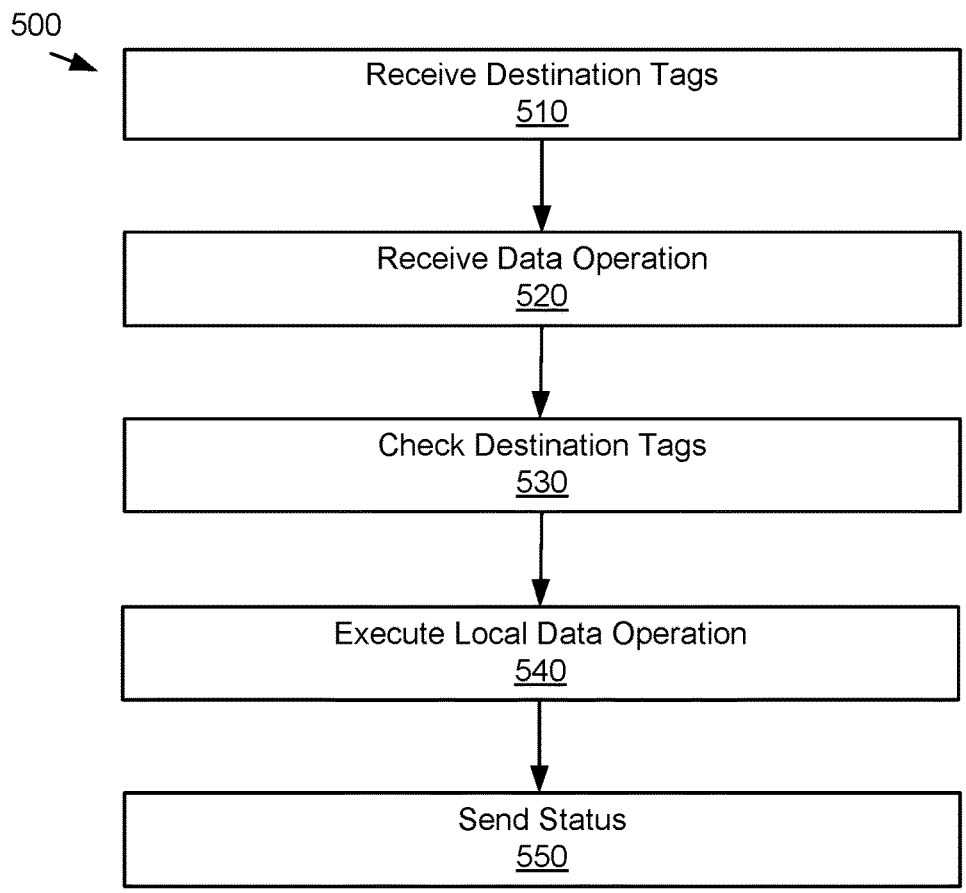
FIG. 5 illustrates an example of a method for receiving a data operation with protection information from a peer storage device.

As shown in FIG. 5, storage device 120.1 operating within data storage system 100 may be operated according to peer data transfer operations for processing host data commands among peer data storage devices 120 in accordance with a protection information protocol. For example, storage device 120.1 may respond to one or more data transfer operations from one or more peer storage devices (e.g. storage devices 120) to handle host data commands according to the method 500 illustrated by blocks 510-550 of FIG. 5.

At block 510, destination verification tags may be received at a destination storage device. For example, a source storage device may have received the destination verification tags and forwarded them to the destination storage device. In some embodiments, the destination verification tags may be provided to the destination storage device by a host, storage controller, or peer storage device other than the source storage device. The destination verification tags may be stored in a memory in the destination storage device for use in verification and/or further processing or forwarding.

At block 520, a data operation command or request may be received. For example, the source storage device may send a data transfer operation command message to the destination storage device identifying the requested operation and relevant parameters. In some embodiments, the data operation may include a packetized data transfer of the protection information data block through a peer communication channel. In some embodiments, the data operation may include access information for a remotely addressable memory into which the protection information data block has been written and which may be read by the destination storage device for the data transfer.

At block 530, the destination verification tags may be checked to assure data integrity. For example, a guard field value from the transferred data block may be checked against a calculated destination guard tag value, reference tag field value from the transferred data block may be checked against a verification destination reference tag value, and an application tag field value from the transferred data block may be checked against a verification destination application tag value. If all field values from the transferred data block match their corresponding verification tag values, operation may proceed to block 540. Otherwise, one or more error messages may be generated.

At block 540, a local data operation may be executed by the destination storage device. For example, the received data operation may specify a storage location in the destination storage device and the destination storage device may execute a local write or put operation to store the data block on the media devices of the destination storage device. In some embodiments, the local data operation may include additional processing of the transferred data block, such as modification, encoding, parity calculation, etc.

At block 550, the storage device may send a status message to the source storage device. For example, when the destination storage device has completed the transfer, verification, processing (if necessary), and storage of the protection information data block, the destination storage device may return an operation complete message. In some embodiments, the status message may include protection information tag values for the completed data operations on the destination storage device. In the event that the destination storage device fails protection information verification or another aspect of the peer data operation, an error status message may be returned. In some embodiments, the destination storage device may be an intermediate destination storage device and may act as a source storage device for an additional peer data transfer operation with protection information.

Figure 6:
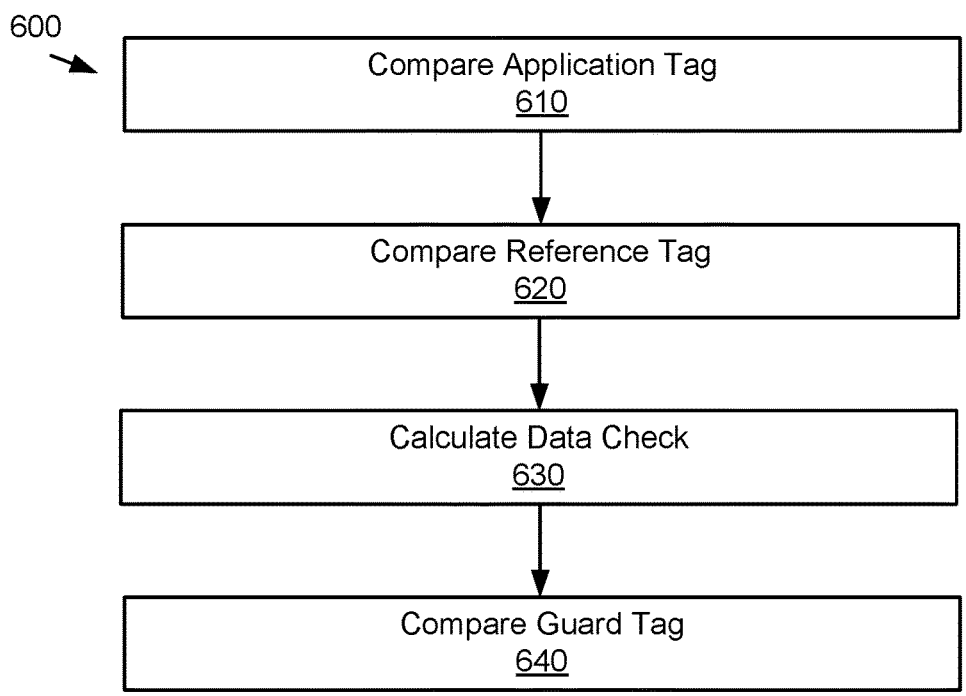
FIG. 6 illustrates an example of a method for checking protection information in a peer storage system.

As shown in FIG. 6, storage device 120.1 operating within data storage system 100 may be operated according to peer data transfer operations for processing host data commands among peer data storage devices 120 in accordance with a protection information protocol. For example, storage device 120.1 may handle protection information verification according to the method 600 illustrated by blocks 610-640 of FIG. 6.

At block 610, a verification application tag value is compared to the application tag field value of a protection information data block. For example, a selected verification application tag value may be compared to the application tag field value in the data block to determine whether there is a match. If all bits match, a valid response may be returned. If any bits do not match, an error response may be returned.

At block 620, a verification reference tag value is compared to the reference tag field value of the protection information data block. For example, a selected verification reference tag value may be compared to the reference tag field value in the data block to determine whether there is a match. If all bits match, a valid response may be returned. If any bits do not match, an error response may be returned.

At block 630, an error check is calculated on the host data to provide a verification guard tag value. For example, a check code engine may calculate a 2 byte CRC value based on a 512 byte host data block to be used for guard field verification.

At block 640, a verification guard tag value is compared to the guard field value of the protection information data block. For example, a calculated verification guard tag value may be compared to the guard field value in the data block to determine whether there is a match. If all bits match, a valid response may be returned. If any bits do not match, an error response may be returned.

Figure 7:
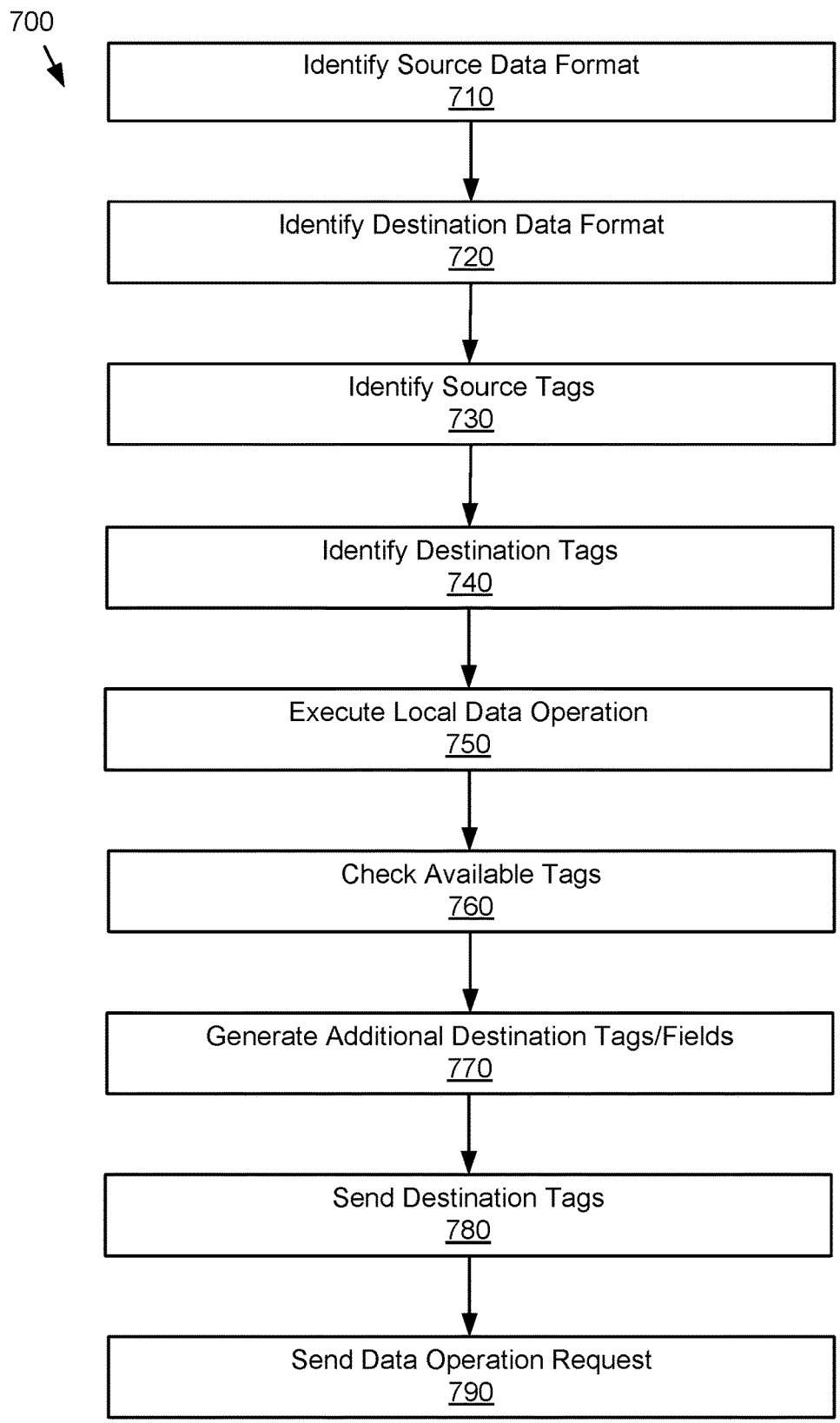
FIG. 7 illustrates an example of another method for sending a data operation with protection information to a peer storage device.

As shown in FIG. 7, storage device 120.1 operating within data storage system 100 may be operated according to peer data transfer operations for processing host data commands among peer data storage devices 120 in accordance with a protection information protocol, where incomplete protection information may be available. For example, storage device 120.1 may respond to one or more host data commands from a storage controller (e.g. storage controller 110), a host (e.g. host 102), and/or one or more peer storage devices (e.g. storage devices 120) to handle host data commands according to the method 700 illustrated by blocks 710-790 of FIG. 7.

At block 710, a source data format may be identified. For example, upon receiving a data command requesting the use of protection information, the receiving storage device may identify the source storage device and determine whether it supports protection information data block format on its storage media. In some embodiments, protection information data block format support may be read from a peer device registry for any device within a peer storage group. If the source data format does not support protection information, no verification of data blocks read from the source storage media may be possible, but protection information and verification may still be used for the data transfer and storage at the destination storage device (if the destination data format supports protection information).

At block 720, a destination data format may be identified. For example, in response to the data command with protection information requesting transfer to a destination storage device, the receiving storage device may identify the destination storage device and determine whether it supports protection information data block format on its storage media. If the destination data format does not support protection information, no verification of data blocks subsequently read from the destination storage media may be possible, but protection information and verification may still be used for the data transfer and, possibly, reading the data block from the source storage device (if the source data format supports protection information).

At block 730, source verification tags may be identified by the receiving storage device. For example, source application tags and source reference tags may be received in association with the data command. In some embodiments, source application tags and/or source reference tags may not be received in the request. In some embodiments, where source application tags are not received, source application tags may be created using the application tag fields read from the protection information data block, if the source data format supports protection information. In some embodiments, where source reference tags are not received, source reference tags may be generated using the host LBA information in the data command or retrieved from LBA mapping information.

At block 740, destination verification tags may be identified by the receiving storage device. For example, destination application tags and destination reference tags may be received in association with the data command. In some embodiments, destination application tags and/or destination reference tags may not be received in the request. In some embodiments, where destination application tags are not received, destination application tags may be created using the application tag fields read from the protection information data block, if the source data format supports protection information. In some embodiments, where destination reference tags are not received, destination reference tags may be generated using the host LBA information in the data command or retrieved from LBA mapping information.

At block 750, a local data operation may be executed by the source storage device. For example, the storage device receiving the data command may include the referenced data block in its storage media and execute a local read or get operation to move the data block into buffer memory. In some embodiments, the local data operation may include additional processing of the read data block, such as modification, encoding, parity calculation, etc. If data processing would change the content of the data block, then a check tags process may be executed at block 760 prior to the data processing.

At block 760, the available protection information tags for the read data block may be checked to verify data integrity. For example, a guard field value from the read data block may be checked against a calculated source guard tag value. If no guard field value is available, the guard verification may be skipped, but the calculated guard tag value may be added to the read data block for use at the destination storage device. A reference tag field value from the read data block may be checked against a (received or generated) verification source reference tag value. If no reference tag field value is available, the reference verification may be skipped, but a verification destination reference tag value may be added to the read data block for use at the destination storage device. An application tag field value from the read data block may be checked against a verification source application tag value. If no application tag field value is available, the application verification may be skipped, but a verification destination application tag value may be added to the read data block for use at the destination storage device. If all field values from the read data block match their corresponding verification tag values, operation may proceed to block 770. Otherwise, one or more error messages may be generated. In some embodiments, a status message regarding verification that could not be attempted due to lack of tags or data field values may be provided and may not prevent further processing of the data operation.

At block 770, destination tags and/or fields may be selectively generated and/or updated to support the data transfer to the destination storage device. For example, a calculated guard field, reference tag field generated from LBA information, and/or destination reference and application fields received with the data operation may be added to the read data block. A set of verification destination tags and matching protection information fields in the protection information data block may be prepared for verification of the peer data transfer for any combination of received verification tags and source and destination data formats.

At block 780, the verification destination tags may be sent to a peer storage device for receiving the data transfer. For example, the data command may specify the destination storage location by storage device and/or host LBA and the source storage device may forward the destination verification tags to the peer storage device using a peer communication channel.

At block 790, the peer data operation may be sent to the destination storage device. For example, the peer storage device may receive a data transfer command for reading the data block from a remotely addressable memory buffer in the storage device that received the host command and now contains the protection information data block for transfer. The peer data operation may include both peer data transfer parameters and destination storage location and/or other data processing parameters to be executed at the peer storage device. Further processing by the destination storage device may proceed as described above with regard to FIG. 5 and the source storage device may receive a status message as described above with regard to FIG. 4.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g. through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage system, comprising:
a first storage device configured to execute data operations with a protection information data block format and including:
a first storage medium;
a first check code engine configured to calculate a first data check value for a guard tag format associated with the protection information data block format;
a first guard tag comparator configured to compare a guard tag value to the first data check value calculated by the first check code engine for a target data block stored in the first storage medium; and
a first reference tag comparator configured to compare a source verification reference tag value to a source data block reference tag value for the target data block stored in the first storage medium, wherein a reference tag format is associated with the protection information data block format;
a second storage device configured to execute data operations with the protection information data block format and including:
a second storage medium;
a second check code engine configured to calculate a second data check value for the guard tag format associated with the protection information data block format;
a second guard tag comparator configured to compare the guard tag value to the second data check value calculated by the second check code engine for the target data block received from the first storage device; and
a second reference tag comparator configured to compare a destination verification reference tag value to a destination data block reference tag value for the target data block, wherein the destination verification reference tag value is received from the first storage device; and
a peer communication channel from the first storage device to the second storage device configured to transfer command messages and data blocks between the first storage device and the second storage device, wherein:
the first storage device is configured to transfer, responsive to the source verification reference tag value matching the source data block reference tag value, the destination verification reference tag value and the target data block to the second storage device through the peer communication channel; and
the second storage device is configured to execute, responsive to the destination verification reference tag value matching the destination data block reference tag value, a data operation using:

the target data block received through the peer communication channel; and
the second storage medium.

2. The storage system of claim 1, wherein the first storage device further includes:
a protection information handler configured to identify a media storage format of the first storage device, wherein the media storage format corresponds to a non-supporting format if data blocks stored to the first storage medium in the first storage device are not formatted with the protection information data block format; and
a reference tag generator configured to generate the destination verification reference tag value from logical block mapping information associated with the target data block if the media storage format is the non-supporting format.

3. The storage system of claim 1, wherein the first storage device further includes:
a command handler configured to receive a data operation command that uses the protection information data block format for transferring the target data block between the first storage device and the second storage device.

4. The storage system of claim 3, wherein the data operation command includes:
the source verification reference tag value; and
the destination verification reference tag value.

5. The storage system of claim 3, wherein:
the data operation command does not include the destination verification reference tag value; and
the first storage device further includes:
a reference tag generator configured to generate the destination verification reference tag value from logical block mapping information associated with the target data block in the second storage device.

6. The storage system of claim 3, wherein:
the data operation command includes an application tag value for an application tag format associated with the protection information data block format; and
the peer communication channel is configured to transfer the application tag value from the first storage device to the second storage device.

7. The storage system of claim 3, wherein:
the data operation command does not include an application tag value for an application tag format associated with the protection information data block format;
the first storage device is configured to read the application tag value from the target data block in the first storage device; and
the peer communication channel is configured to transfer the application tag value from the first storage device to the second storage device.

8. A computer-implemented method, comprising:
receiving, by a first storage device, a data operation command that uses a protection information data block format for transferring a target data block between the first storage device and a second storage device;
executing, by the first storage device, a first local data operation based on the data operation command to operate on the target data block in a first storage medium in the first storage device;
comparing, by the first storage device, a source verification reference tag value to a source data block reference tag value for the target data block stored in the first storage device, wherein a reference tag format is associated with the protection information data block format;
transferring, responsive to the source verification reference tag value matching the source data block reference tag value, a destination verification reference tag value and the target data block from the first storage device to the second storage device through a peer communication channel;
comparing, by the second storage device, the destination verification reference tag value to a destination data block reference tag value for the target data block; and
executing, responsive to the destination verification reference tag value matching the destination data block reference tag value, a second local data operation using:
the target data block received through the peer communication channel; and
a second storage medium in the second storage device.

9. The computer-implemented method of claim 8, further comprising:
identifying, by the first storage device, a media storage format of the first storage device, wherein the media storage format corresponds to a non-supporting format if data blocks stored to the first storage medium in the first storage device are not formatted with the protection information data block format; and
generating, by the first storage device, the destination verification reference tag value from logical block mapping information associated with the target data block if the media storage format is the non-supporting format.

10. The computer-implemented method of claim 8, wherein the data operation command includes:
the source verification reference tag value; and
the destination verification reference tag value.

11. The computer-implemented method of claim 8, wherein:
the data operation command does not include the destination verification reference tag value; and
the computer-implemented method further comprises:
generating, by the first storage device, the destination verification reference tag value from logical block mapping information associated with the target data block in the second storage device.

12. The computer-implemented method of claim 8, wherein:
the data operation command includes an application tag value for an application tag format associated with the protection information data block format; and
the computer-implemented method further comprises:
transferring the application tag value from the first storage device to the second storage device through the peer communication channel.

13. The computer-implemented method of claim 8, wherein:
the data operation command does not include an application tag value for an application tag format associated with the protection information data block format; and
the computer-implemented method further comprises:
reading, by the first storage device, the application tag value from the target data block in the first storage device; and
transferring the application tag value from the first storage device to the second storage device through the peer communication channel.

14. A storage device, comprising:
at least one storage medium;
means for executing, based on a data operation command, a first local data operation to operate on a target data block in the at least one storage medium;
means for calculating a first data check value for a guard tag format associated with a protection information data block format;
means for comparing a guard tag value to the first data check value for the target data block;
means for comparing a source verification reference tag value to a source data block reference tag value for the target data block stored in the at least one storage medium, wherein a reference tag format is associated with the protection information data block format; and
means for transferring, responsive to the guard tag value matching the first data check value and the source verification reference tag value matching the source data block reference tag value, a destination verification reference tag value and the target data block to a peer storage device through a peer communication channel.

15. The storage device of claim 14, further comprising:
means for identifying a media storage format of the at least one storage medium, wherein the media storage format corresponds to a non-supporting format if data blocks stored to the at least one storage medium are not formatted with the protection information data block format; and
means for generating the destination verification reference tag value from logical block mapping information associated with the target data block if the media storage format is the non-supporting format.

16. The storage device of claim 14, further comprising:
means for receiving a data operation command that uses the protection information data block format for transferring the target data block between the at least one storage medium and the peer storage device.

17. The storage device of claim 16, wherein the data operation command includes:
the source verification reference tag value; and
the destination verification reference tag value.

18. The storage device of claim 16, wherein:
the data operation command does not include the destination verification reference tag value; and
the storage device further comprises:
means for generating the destination verification reference tag value from logical block mapping information associated with the target data block in the peer storage device.

19. The storage device of claim 16, wherein:
the data operation command includes an application tag value for an application tag format associated with the protection information data block format; and
the storage device further comprises:
means for transferring the application tag value to the peer storage device.

20. The storage device of claim 16, wherein:
the data operation command does not include an application tag value for an application tag format associated with the protection information data block format; and
the storage device further comprises:
means for reading the application tag value from the target data block in the at least one storage medium; and
means for transferring the application tag value to the peer storage device.

21. A storage system, comprising:
- a first storage device configured to execute data operations with a protection information data block format and including:
  - a first storage medium;
  - a first check code engine configured to calculate a first data check value for the protection information data block format; and
  - a first protection information comparator configured to compare a first protection information tag value to the first data check value calculated by the first check code engine for a target data block in the first storage medium;
- a second storage device configured to execute data operations with the protection information data block format and including:
  - a second storage medium;
  - a second check code engine configured to calculate a second data check value for the protection information data block format; and
  - a second protection information comparator configured to compare a second protection information tag value to the second data check value calculated by the second check code engine for the target data block; and
- a peer communication channel from the first storage device to the second storage device configured to transfer command messages and data blocks between the first storage device and the second storage device, wherein:
  - the first storage device is configured to transfer, responsive to the first protection information tag value matching the first data check value, at least one destination verification protection information tag value and the target data block to the second storage device through the peer communication channel;
  - the at least one destination verification protection information tag value includes the second protection information tag value; and
  - the second storage device is configured to execute, responsive to the second protection information tag value matching the second data check value, a data operation using:
    - the target data block received through the peer communication channel; and
    - the second storage medium.

* * * * *